(12) United States Patent
Yang et al.

(10) Patent No.: US 9,877,609 B2
(45) Date of Patent: Jan. 30, 2018

(54) GRILL DEVICE

(71) Applicant: Tsann Kuen (Zhangzhou) Enterprise Co., Ltd., Zhangzhou (CN)

(72) Inventors: Yongshan Yang, Zhangzhou (CN); Chunhua Li, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 434 days.

(21) Appl. No.: 14/793,019

(22) Filed: Jul. 7, 2015

(65) Prior Publication Data
US 2016/0015212 A1    Jan. 21, 2016

(30) Foreign Application Priority Data
Jul. 18, 2014    (CN) .......................... 2014 2 0400489

(51) Int. Cl.
*A47J 37/06*    (2006.01)

(52) U.S. Cl.
CPC .... *A47J 37/0611* (2013.01); *A47J 2037/0617* (2013.01)

(58) Field of Classification Search
CPC ..... A47J 37/06; A47J 37/0611; A47J 37/0617
USPC ......... 99/372, 374, 377, 378, 379, 380, 381, 99/382
See application file for complete search history.

(56) References Cited

U.S. PATENT DOCUMENTS

| | | | | |
|---|---|---|---|---|
| 2007/0017384 A1* | 1/2007 | Serra | .................... | A47J 37/0611 99/372 |
| 2007/0277678 A1* | 12/2007 | Mangano | ............. | A47J 37/0611 99/426 |
| 2010/0116146 A1* | 5/2010 | Xie | ..................... | A47J 37/0611 99/357 |

* cited by examiner

*Primary Examiner* — Michael Laflame, Jr.
(74) *Attorney, Agent, or Firm* — Husch Blackwell LLP

(57) ABSTRACT

A grill device includes a coupling mechanism having first and second ratchet teeth that cooperate to permit movement of an upper grill unit in a first direction for uncovering a lower grill unit, and to resist movement of the upper grill unit relative to the lower grill unit in a second direction opposite to the first direction.

14 Claims, 10 Drawing Sheets

GRILL DEVICE

CROSS-REFERENCE TO RELATED APPLICATION

This application claims priority of Chinese Utility Model Application No. 201420400489.7, filed on Jul. 18, 2014.

FIELD

The disclosure relates to a grill device, and more particularly to a grill device that permits fine position adjustment of an upper grill unit.

BACKGROUND

Referring to FIGS. 1 and 2, a conventional grill device includes a lower grill unit 11 and an upper grill unit 12 that is movable to a selected one of a fully covered position (not shown), a half-opened position (see FIG. 2), and a fully opened position (see FIG. 1), relative the lower grill unit 11. The conventional grill device does not permit fine adjustment of the position of the upper grill unit 12 relative to the lower grill unit 11.

SUMMARY

An object of the disclosure is to provide a grill device with an upper grill unit that may be retained at a selected one of multiple positions relative to a lower grill unit.

According to the disclosure, a grill device comprises a lower grill unit, an upper grill unit, and a coupling mechanism that connects the upper grill unit to the lower grill unit.

The coupling mechanism includes a connection base connected to the lower grill unit, a lever connected to the upper grill unit, a first seat member connected to the connection base, a second seat member connected to the lever, coupled pivotally to the first seat member, and rotatable relative to the first seat member about a pivot axis, and a ratchet unit.

The ratchet unit includes first ratchet teeth disposed adjacent to one of the first seat member and the second seat member, and second ratchet teeth disposed adjacent to the other one of the first seat member and the second seat member. The second ratchet teeth are movable relative to the other one of the first seat member and the second seat member along the pivot axis, and abut against the first ratchet teeth when the second ratchet teeth are at an abutting position relative to the other one of the first seat member and the second seat member.

The first ratchet teeth and the second ratchet teeth are configured such that, when the second ratchet teeth are at the abutting position, the first ratchet teeth and the second ratchet teeth cooperate to permit rotation of the second seat member in a first direction relative to the first seat member and to permit movement of the upper grill unit in the first direction for uncovering the lower grill unit, and to resist rotation of the second seat member relative to the first seat member in a second direction opposite to the first direction and to resist movement of the upper grill unit in the second direction relative to the lower grill unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
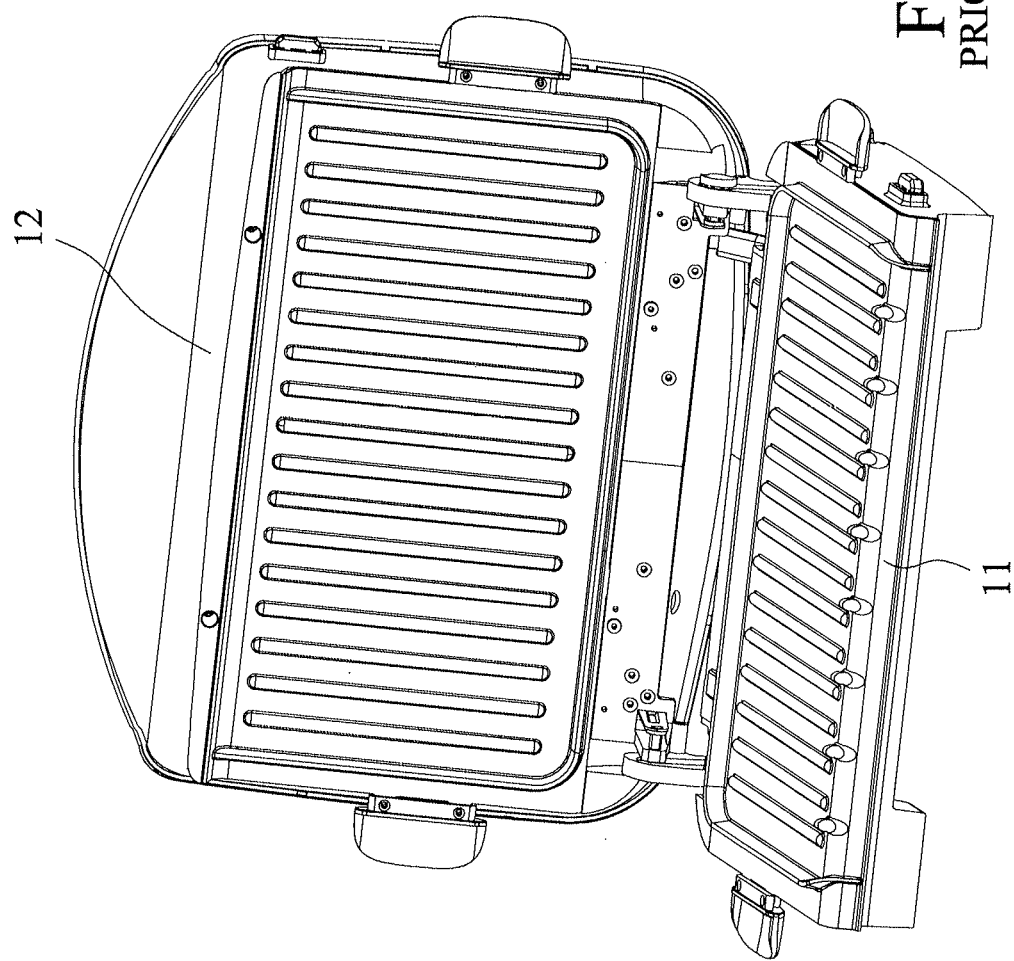
FIG. 1 is a perspective view of a conventional grill device.
Figure 2:
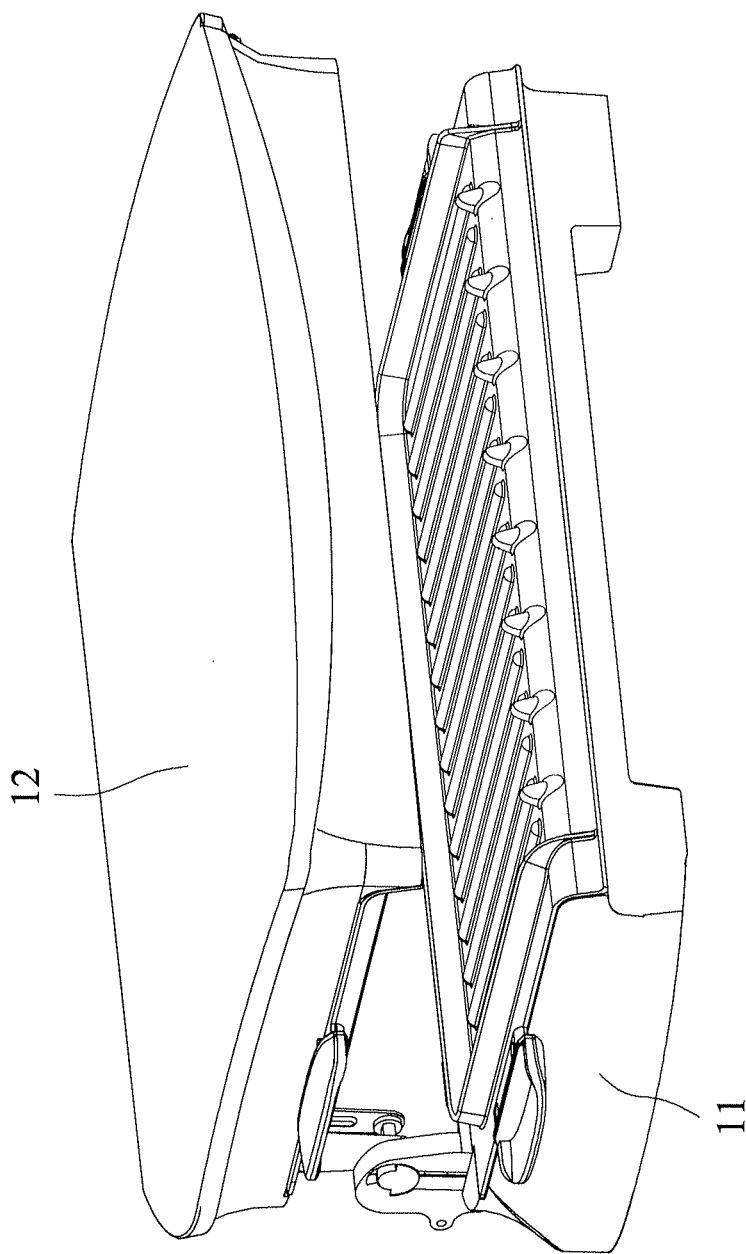
FIG. 2 is another perspective view of the conventional grill device.

Before the disclosure is described in greater detail, it should be noted that like elements are denoted by the same reference numerals throughout the disclosure.

Figure 3:
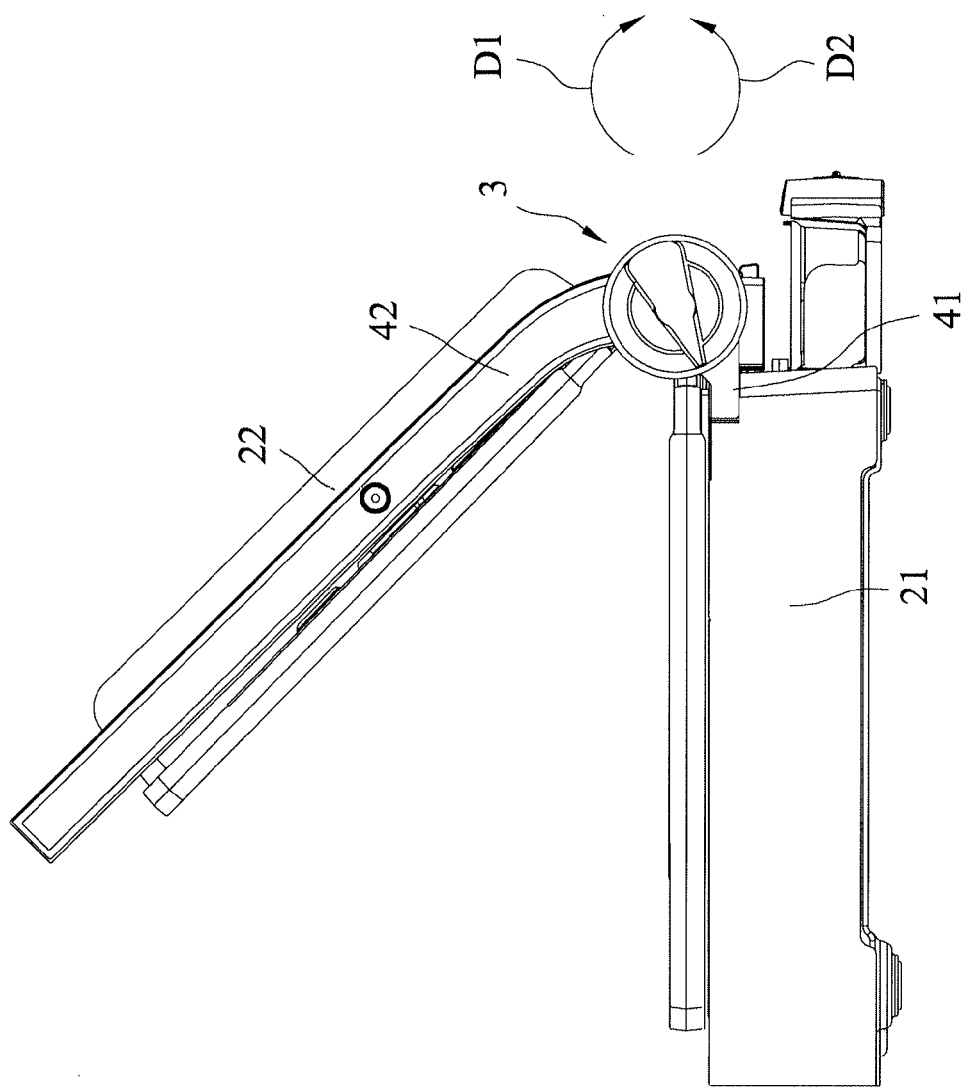
FIG. 3 is a schematic side view illustrating a first embodiment of a grill device according to the disclosure.

Referring to FIG. 3, the first embodiment of a grill device according to the disclosure includes a lower grill unit 21, an upper grill unit 22 to cover and uncover the lower grill unit 21, and a pair of coupling mechanisms 3 that connect the upper grill unit 22 to the lower grill unit 21 and that are disposed at left and right sides of the lower and upper grill units 21, 22, respectively. Since the two coupling-mechanisms 3 are symmetrical in configuration, only one is shown in the drawings. Moreover, since the feature of the grill device of the present disclosure does not reside in the specific configurations of the lower and upper grill units 21, 22, which may be readily appreciated by those skilled in the art, further details of the same will be omitted herein for the sake of brevity. Furthermore, the grill device of the present disclosure should not be limited to include two coupling mechanisms 3, and may be modified by replacing one coupling mechanism 3 with a pivot mechanism (not shown).

By virtue of the coupling mechanisms 3, the upper grill unit 22 may be moved relative to the lower grill unit 21 in a first direction D1 and a second direction D2 opposite to the first direction D1.

Referring to FIGS. 3 to 6, each coupling mechanism 3 includes a connection base 41 connected to the lower grill unit 21, a lever 42 connected to the upper grill unit 22, a first seat member 5 connected to the connection base 41, a second seat member 6 connected to the lever 42, coupled pivotally to the first seat member 5 via a pivot bolt 100, and rotatable relative to the first seat member 5 about a pivot axis (P) defined by the pivot bolt 100, and a ratchet unit. In this embodiment, the ratchet unit includes a stationary wheel 7 non-movably disposed adjacent to the first seat member 5, first ratchet teeth 71 provided at the stationary wheel 7, a rotatable wheel 8 disposed adjacent to the second seat member 6 and movable relative to the second seat member 6 along the pivot axis (P), second ratchet teeth 81 provided at the rotatable wheel 8, and a resilient component 91 disposed to bias the rotatable wheel 8 toward the stationary wheel 7. In this embodiment, each coupling mechanism 3 further includes an adjustment knob 92 disposed at the second seat member 6, connected to the rotatable wheel 8, and movable relative to the second seat member 6 along the pivot axis (P).

In each coupling mechanism 3, the first seat member 5 and the second seat member 6 thereof are disposed to confront each other in a left-right direction. In this embodiment, the first seat member 5 has a first base wall 51 and a first surrounding wall 52 that extends from the first base wall 51 in a direction toward the corresponding second seat member 6. The first base wall 51 and the first surrounding wall 52 cooperate to define a first space 53 that opens toward the corresponding second seat member 6. The first surrounding wall 52 has a plurality of stop surfaces 521 and a plurality of guide surfaces 522 that are alternatingly disposed, and a plurality of connecting surfaces 523 each interconnecting an adjacent pair of the stop surfaces 521 and the guide surfaces 522 and each spaced apart from the first base wall 51. The first surrounding wall 52 further has a plurality of slide grooves 524, each disposed between an adjacent pair of the connecting surfaces 523, each defined by an adjacent pair of the stop surfaces 521 and the guide surfaces 522, and each extending toward the first base wall 51.

In this embodiment, the second seat member 6 has a second base wall 61 and a second surrounding wall 62 that extends from a periphery of the second base wall 61 in opposite directions. The second base wall 61 is formed with a plurality of through holes 611 that are angularly spaced apart from each other, and cooperates with the second surrounding wall 62 to define a remote receiving space 63 and a proximate receiving space 64 that are respectively distal from and proximate to the corresponding stationary wheel 7. The proximate receiving space 64 opens toward the corresponding first seat member 5.

Figure 4:
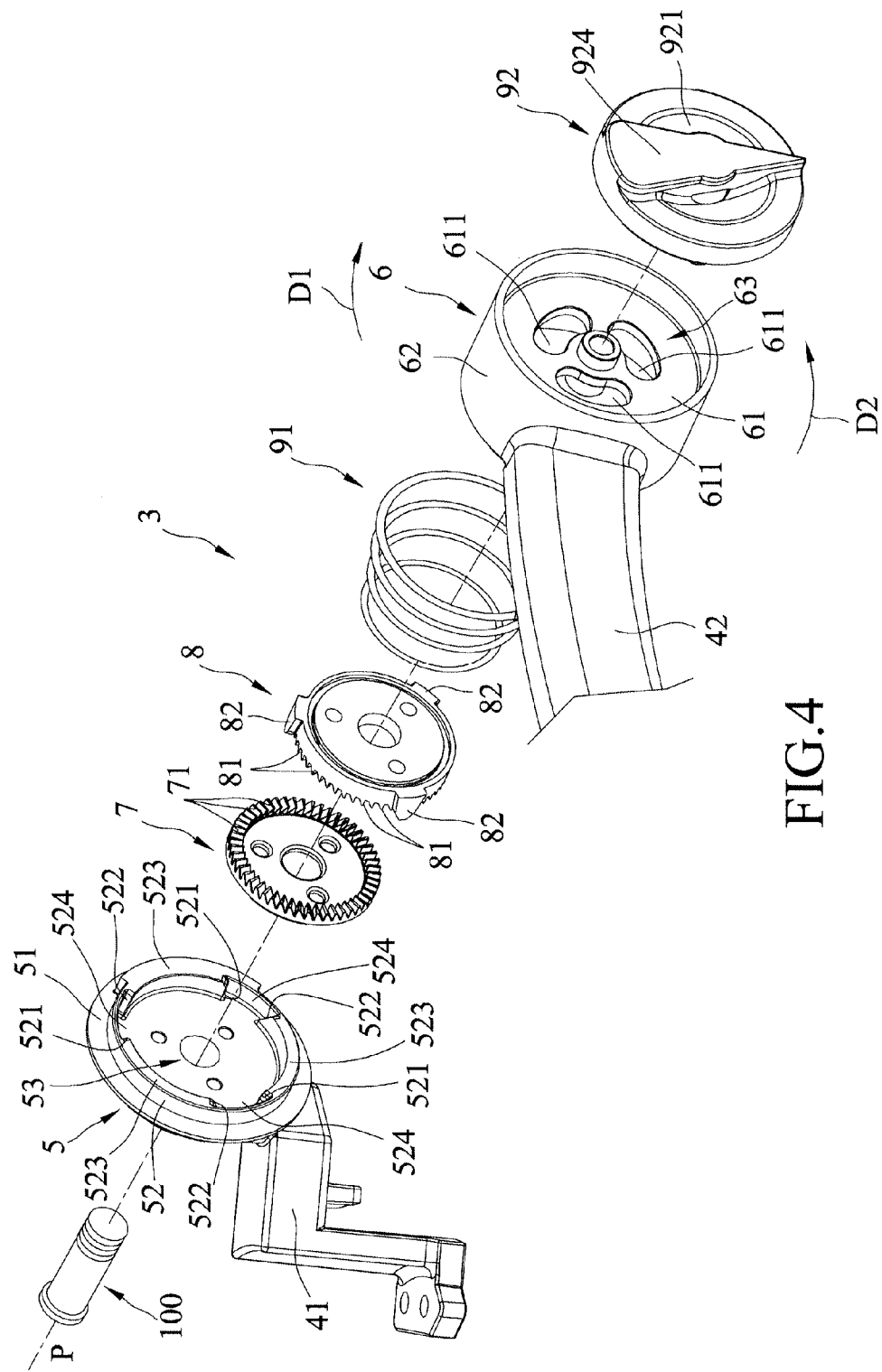
FIG. 4 is an exploded perspective view to illustrate a coupling mechanism included in the first embodiment.
Figure 5:
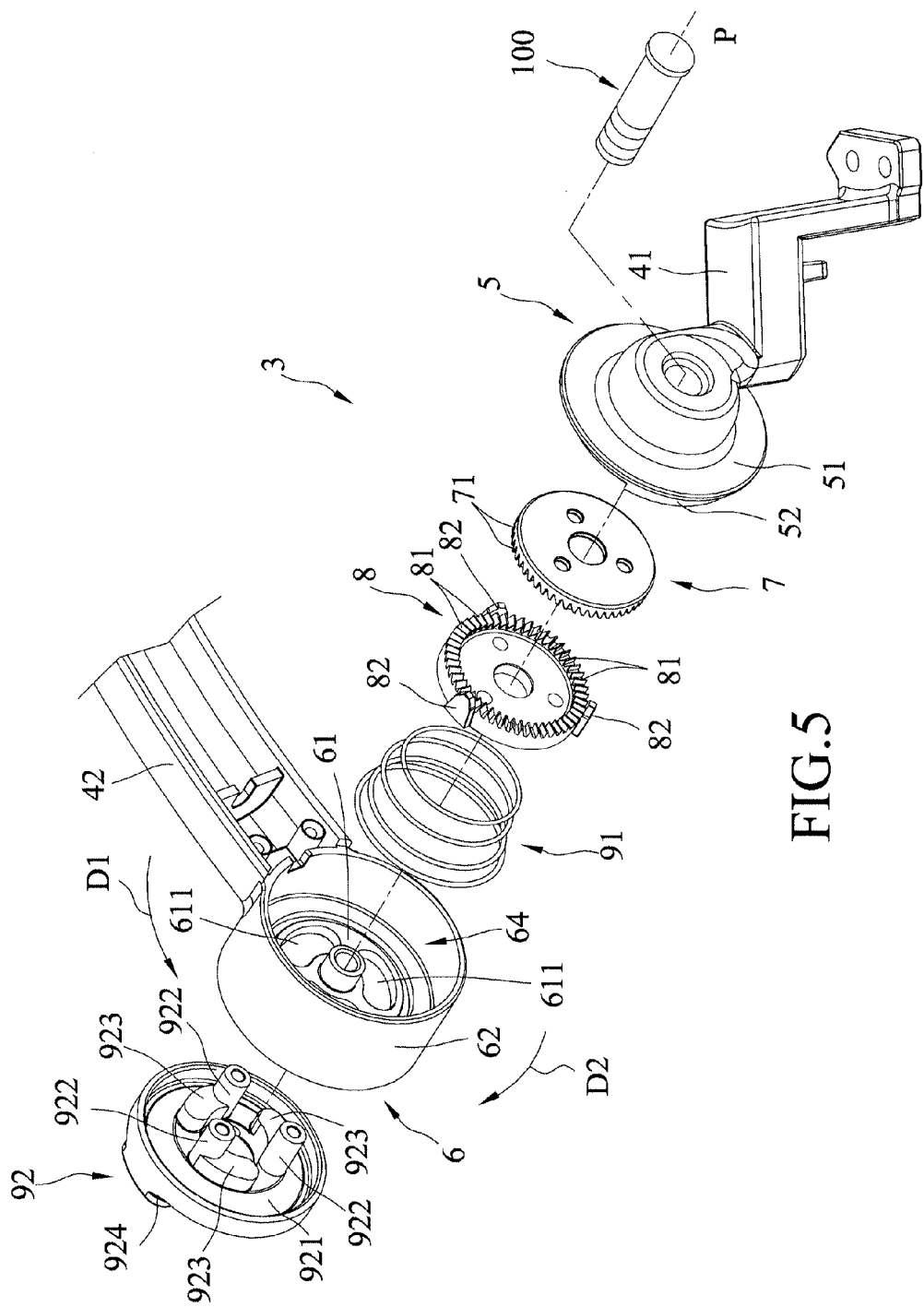
FIG. 5 is another exploded perspective view of the coupling mechanism included in the first embodiment.
Figure 6:
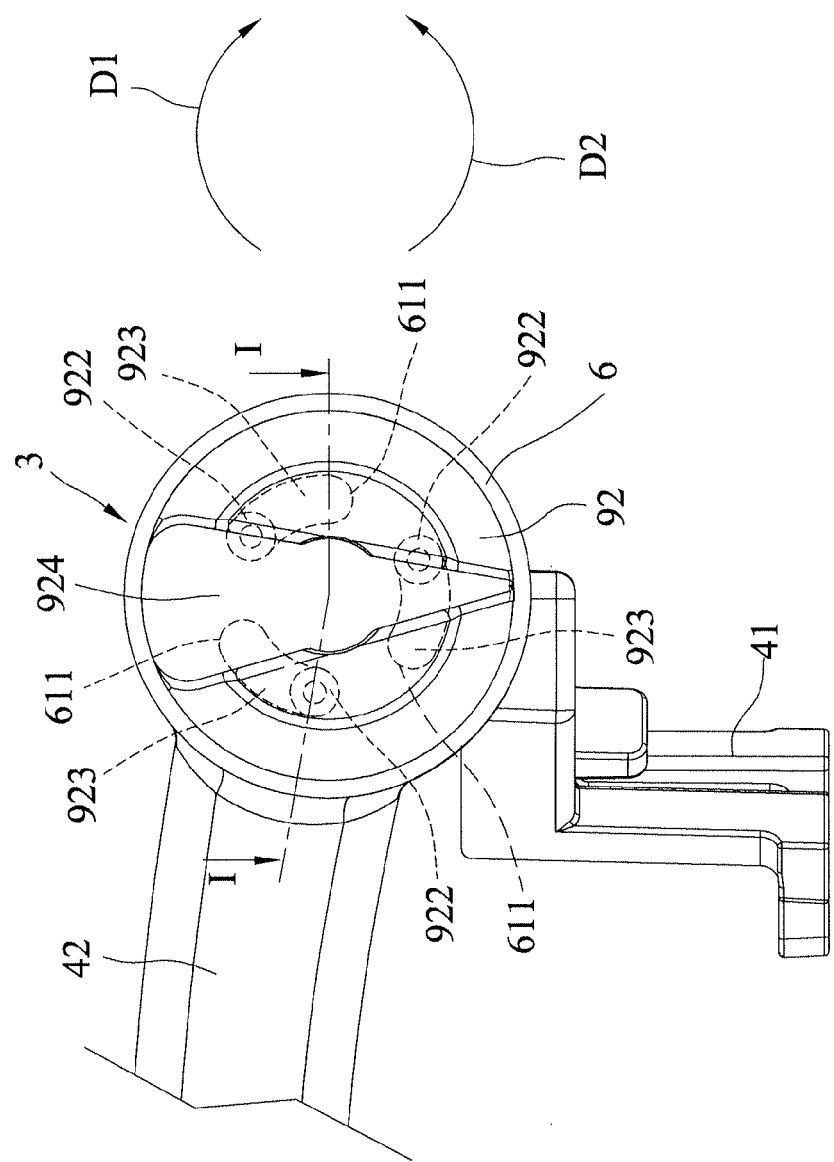
FIG. 6 is a schematic side view of the coupling mechanism included in the first embodiment.
Figure 7:
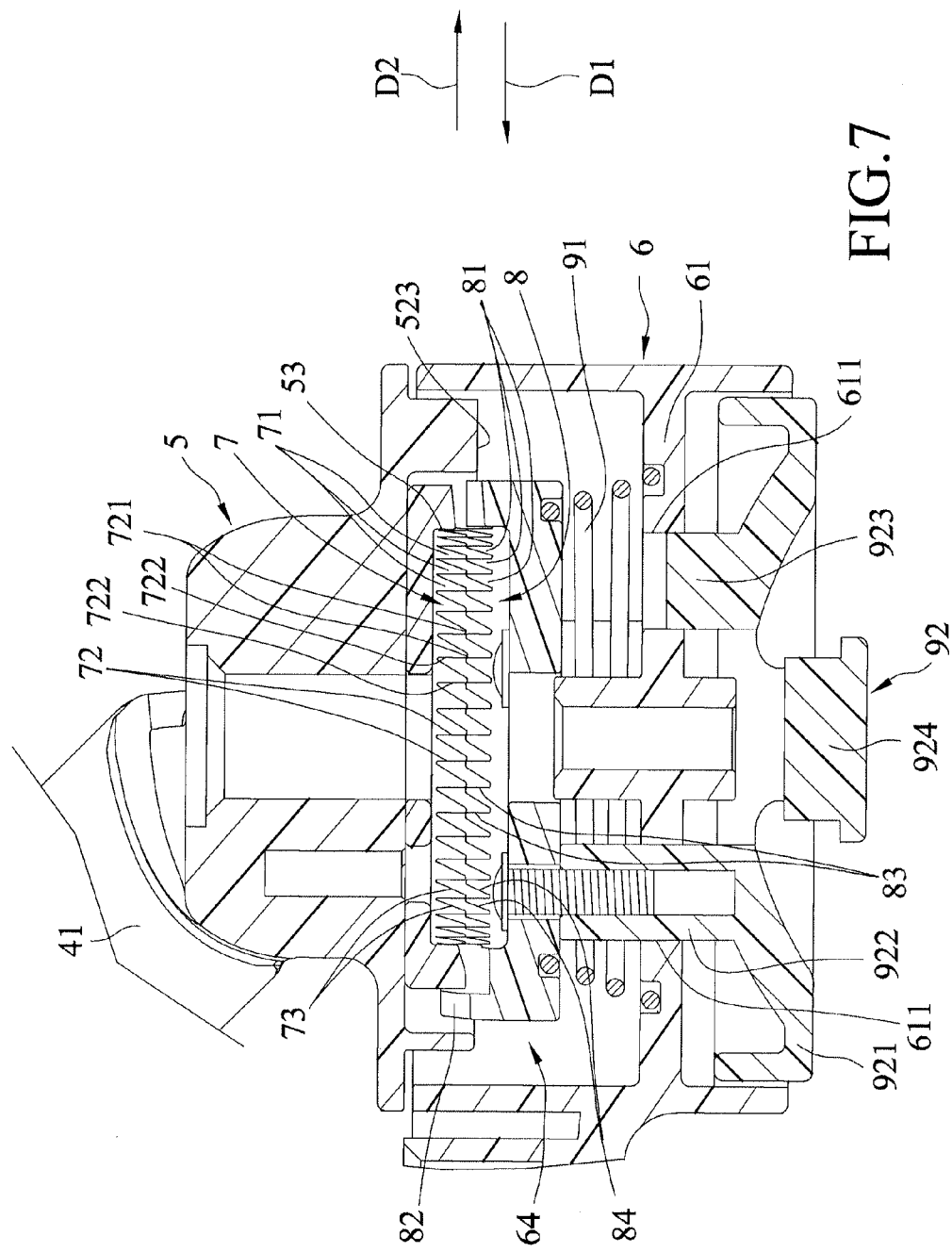
FIGS. 7 and 8 are schematic sectional views taken along line I-I in FIG. 6, illustrating engagement between a stationary wheel and a rotatable wheel when an adjustment knob is at a retaining position.

Referring to FIGS. 4, 5 and 7, in this embodiment, the stationary wheel 7 is a crown-ratchet wheel that is disposed in the first receiving space 53 of the corresponding first seat member 5, and is disposed to confront the rotatable wheel 8. In this embodiment, the first ratchet teeth 71 are interconnected, are arranged in succession in a circumferential row at a periphery of the stationary wheel 7, and extend toward the confronting rotatable wheel 8. In this embodiment, each first ratchet tooth 71 has a first limiting surface 72 that extends toward the confronting rotatable wheel 8, and a first inclined surface 73 that interconnects the first limiting surface 72 of the first ratchet tooth 71 and the first limiting surface 72 of an adjacent one of the first ratchet teeth 71. In this embodiment, for each first ratchet tooth 71, a distance of the first inclined surface 73 to the confronting rotatable wheel 8 is at a minimum at a junction with the first limiting surface 72 and gradually increases in the second direction D2. In this embodiment, for each first ratchet tooth 71, the first limiting surface 72 has a connecting surface portion 721 and a limiting surface portion 722 that are connected to each other. The connecting surface portion 721 is connected between the limiting surface portion 722 and the first inclined surface 73.

In this embodiment, the rotatable wheel 8 is a crown-ratchet wheel that is disposed in the proximate receiving space 64 of the corresponding second seat member 6. In this embodiment, the second ratchet teeth 81 are interconnected, are arranged in succession in a circumferential row at a periphery of the rotatable wheel 8, and extend toward the confronting stationary wheel 7. In this embodiment, each second ratchet tooth 81 has a second limiting surface 83 that extends toward the confronting stationary wheel 7, and a second inclined surface 84 that interconnects the second limiting surface 83 of the second ratchet tooth 81 and the second limiting surface 83 of an adjacent one of the second ratchet teeth 81. In this embodiment, for each second ratchet tooth 81, a distance of the second inclined surface 84 to the confronting stationary wheel 7 is at a minimum at a junction with the second limiting surface 83 and gradually increases in the first direction D1. In this embodiment, the rotatable wheel 8 has an outer edge provided with a plurality of guide blocks 82 that project toward the first seat member 5. Each guide block 82 has an axial dimension larger than an axial dimension of the second ratchet teeth 81, and extends into one of the slide grooves 524 at the first seat member 5.

In this embodiment, the resilient component 91 is a spring connected to the corresponding rotatable wheel 8. The resilient component 91 is disposed between the second base wall 61 and the corresponding rotatable wheel 8 in the proximate receiving space 64 of the second seat member 6, and provides a biasing force that biases the corresponding rotatable wheel 8 away from the second base wall 61 and toward the corresponding stationary wheel 7.

In this embodiment, the adjustment knob 92 has a knob wall 921 disposed in the remote receiving space 63 of the second seat member 6, a plurality of connecting posts 922 that extend from the knob wall 921, that extend through the through holes 611 in the second base wall 61 of the second seat member 6, and that are connected to the rotatable wheel 8, a plurality of positioning blocks 923 respectively adjacent and respectively connected to the connecting posts 922, and a handling part 924 that extends from the knob wall 921 in a direction away from the second base wall 61 of the second seat member 6. The connecting posts 922 are connected to the rotatable wheel 8 using screws. Hence, the adjustment knob 92 and the rotatable wheel 8 are co-movable. Each positioning block 923 together with the connecting post 922 connected thereto passes through a respective one of the through holes 611 in the second base wall 61 of the corresponding second seat member 6 in such a manner that the adjustment knob 92 and the corresponding second seat member 6 are co-rotatable. While the positioning blocks 923 are connected to the connecting posts 922 in this embodiment, the present disclosure is not limited in this respect, and the positioning blocks 923 may be spaced apart from the connecting posts 922 in other embodiments. Since the adjustment knob 92 and the second seat member 6 are linked together, and since the adjustment knob 92 and the rotatable wheel 8 are linked together, lifting the lever 42 may drive rotation of the second seat member 6 relative to the first seat member 5, and consequently result in rotation of the adjustment knob 92 and the rotatable wheel 8 with the second seat member 6.

Referring to FIGS. 3, 5 and 7, lifting the lever 42 in the first direction D1 brings about opening movement of the upper grill unit 22 relative to the lower grill unit 21. The lever 42 brings the second seat member 6 and the rotatable wheel 8 to rotate in the first direction D1 relative to the first seat member 5 and the stationary wheel V. The second inclined surfaces 84 of the second ratchet teeth 81 of the rotatable wheel 8 initially slide along the first inclined surfaces 73 of the first ratchet teeth 71 of the stationary wheel 7, followed by the second ratchet teeth 81 eventually abutting against the connecting surface portions 721 of the first ratchet teeth 71. The second ratchet teeth 81 are at a first tooth position at this time, as best shown in FIG. 7. As the second ratchet teeth 81 slide along the first inclined surfaces 73, the rotatable wheel 8 is pushed away from the stationary wheel 7 against biasing action of the resilient component 91, thereby storing a restoring force in the resilient component 91.

Figure 8:
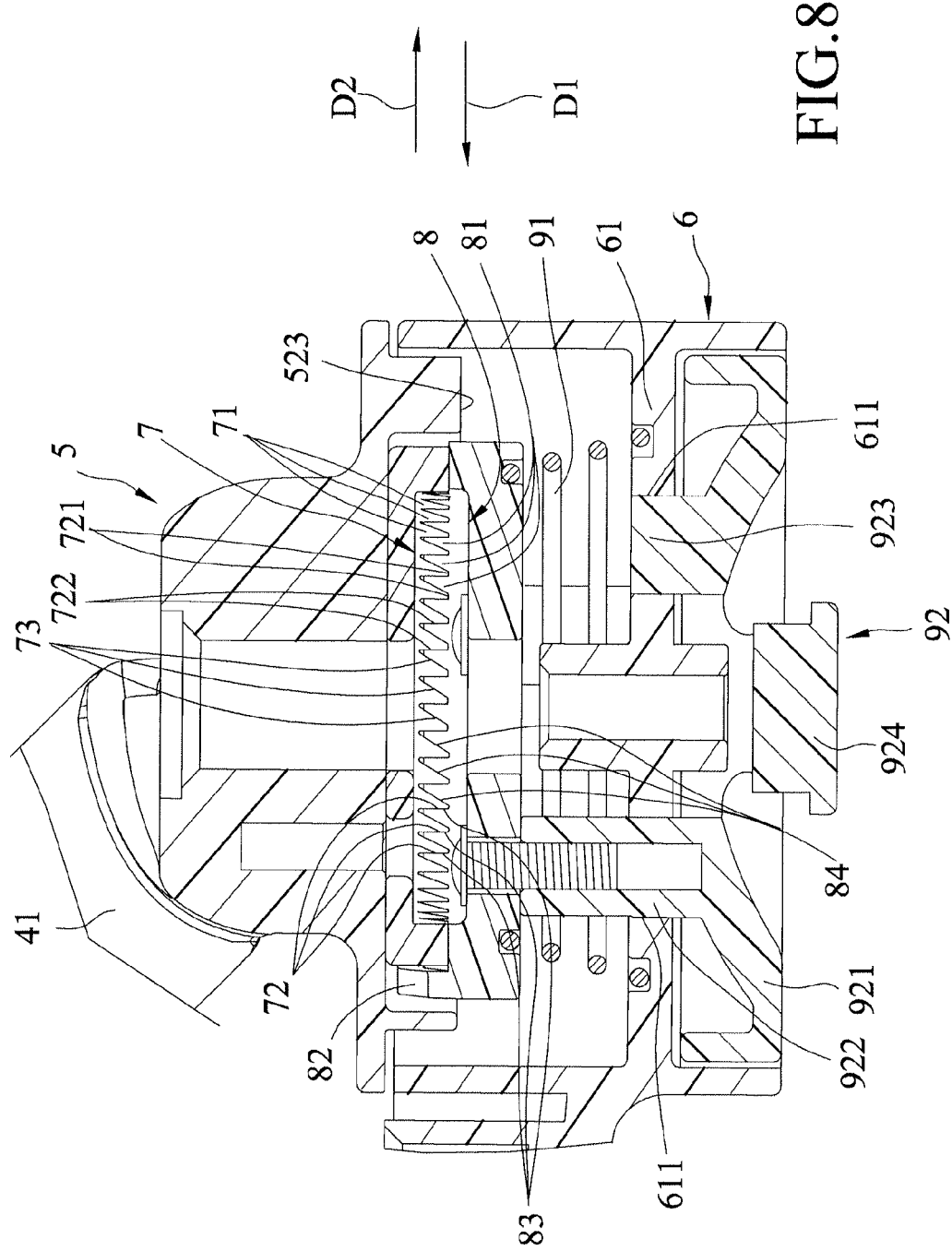

Further opening movement of the upper grill member 22 displaces the second ratchet teeth 81 in the first direction D1, and the second ratchet teeth 81 eventually move past the connecting surface portions 721 of the first ratchet teeth 71. At this time, as best shown in FIG. 8, the rotatable wheel 8 is biased by the resilient component 91 to move toward the stationary wheel 7 so as to dispose the second ratchet teeth 81 at a second tooth position in which the second ratchet teeth 81 mesh with the first ratchet teeth 71. When the second ratchet teeth 81 mesh with the first ratchet teeth 71, each second ratchet tooth 81 is disposed between the first limiting surface 72 and the first inclined surface 73 of adjacent ones of the first ratchet teeth 71, and the second limiting surfaces 83 of the second ratchet teeth 81 abut against the first limiting surfaces 72 of the first ratchet teeth 71, thereby arresting rotation of the rotatable wheel 8 in the second direction D2 relative to the stationary wheel 7. In this way, closing movement of the upper grill unit 22 relative to the lower grill unit 21 may be resisted, and the upper grill unit 22 may be retained at a desired open position relative to the lower grill unit 21.

It is evident from the above description that, by virtue of cooperative action between the first ratchet teeth 71 and the second ratchet teeth 81, slight rotation of the rotatable wheel 8 in the first direction D1 relative to the stationary wheel 7 may result in switching of the second ratchet teeth 81 between the first and second tooth positions to make multi-step fine adjustment of the open position of the upper grill unit 22 relative to the lower grill unit 21 possible.

Figure 9:
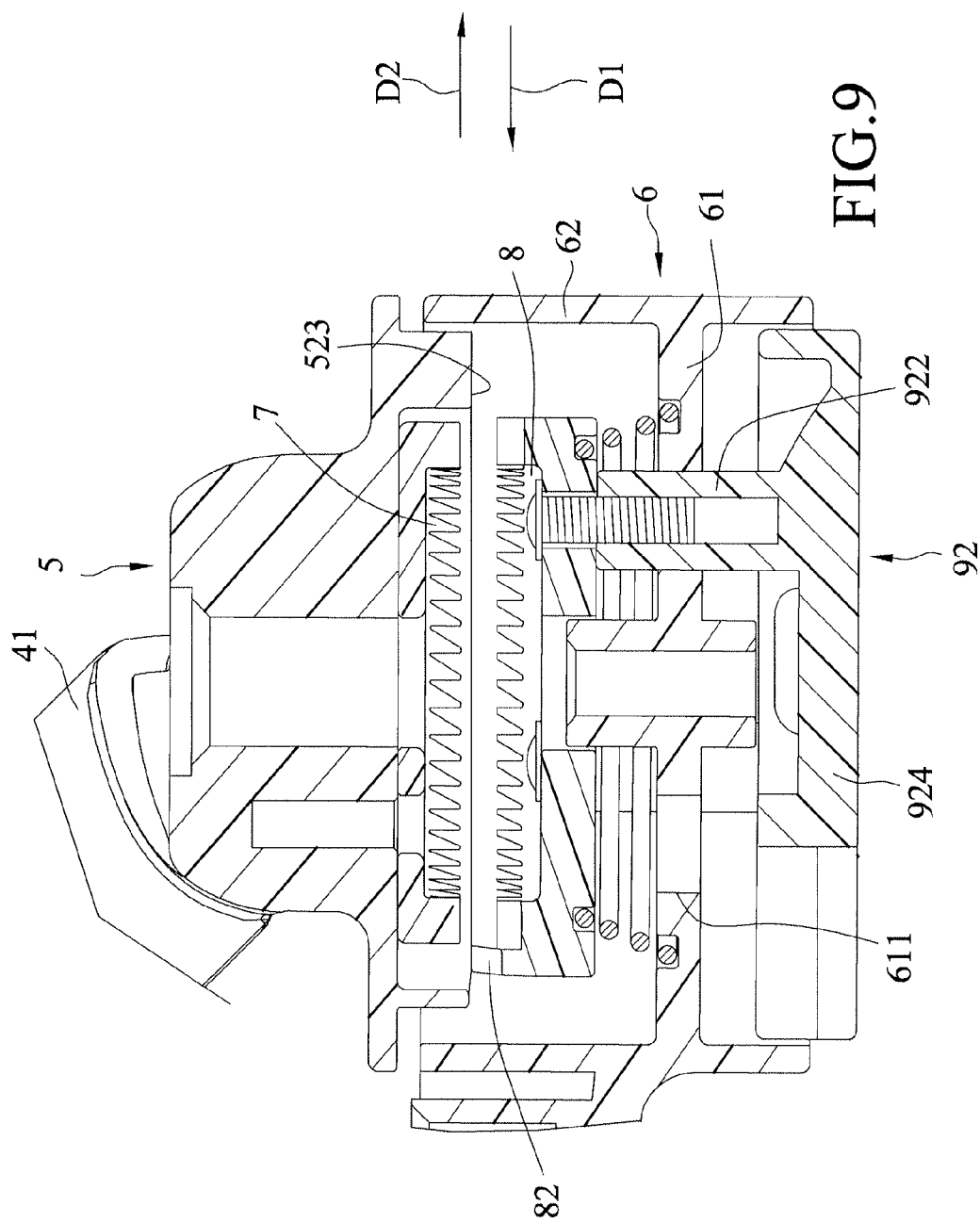
FIG. 9 is another schematic sectional view taken along line I-I in FIG. 6, illustrating an adjusting position of the adjustment knob.

Referring to FIGS. 4, 8 and 9, to close the upper grill unit 22, the adjustment knob 92 is pulled away from the stationary wheel 7 from a retaining position shown in FIG. 8 to an adjusting position shown in FIG. 9. When the adjustment knob 92 is at the retaining position, the second ratchet teeth 81 are able to abut against the first ratchet teeth 71 at the first or second tooth positions (also called abutting position of the second ratchet teeth 81 relative to the second seat member 6), and the positioning blocks 923 of the adjustment knob 92 are disposed in the through holes 611 of the second seat member 6. To move the adjustment knob 92 from the retaining position to the adjusting position, the handling part 924 of the adjustment knob 92 is operated to remove the positioning blocks 923 of the adjustment knob 92 from the through holes 611 of the second seat member 6, and to move the rotatable wheel 8 away from the stationary wheel 7 so as to disengage the second ratchet teeth 81 from the first ratchet teeth 71. Rotation of the rotatable wheel 8 in the second direction D2 relative to the stationary wheel 7 is not hindered by the stationary wheel 7 at this time.

Subsequently, the adjustment knob 92 is rotated in the first direction D1 to reach the adjusting position shown in FIG. 9. As shown in FIG. 9, the positioning blocks 923 of the adjustment knob 92 are not aligned with the through holes 611 of the second seat member 6 and abut against the second base wall 61 of the second seat member 6. The positioning blocks 923 are thus limited by the second base wall 61 to prevent the rotatable wheel 8 from moving toward the stationary wheel 7 as a result of the biasing action of the resilient component 91, to arrest movement of the adjustment knob 92 back to the retaining position, and to ensure that the rotatable wheel 8 is separated from the stationary wheel 7. When the adjustment knob 92 is at the adjusting position, the lever 42 may be lifted up further, or lowered to close the upper grill unit 22.

In the above description, the adjustment knob 92 is first pulled and then rotated to switch from the retaining position to the adjusting position. However, the present disclosure should not be limited in this respect. The adjustment knob 92 may be rotated without being pulled first to switch from the retaining position to the adjusting position. In detail, when the adjustment knob 92 rotates, the corresponding rotatable wheel 8 rotates therewith, and the guide blocks 82 of the rotatable wheel 8 move out of the slide grooves 524 at the first seat member 5 by sliding along the guide surfaces 522 of the first surrounding wall 52 to reach the connecting surfaces 523 of the first surrounding wall 52. When the guide blocks 82 are at the connecting surfaces 523, because the axial dimension of each guide block 82 is larger than that of the second ratchet teeth 81, and because of the thickness of the first surrounding wall 52 of the first seat member 5, the rotatable wheel 8 is disengaged from the stationary wheel 7 and pushes the adjustment knob 92 away from the first seat member 5 and away from the second base wall 61 of the second seat member 6. The effect is thus similar to the adjustment knob 92 being pulled away from the second base wall 61 of the second seat member 6 to dispose the adjustment knob 92 at the adjusting position.

When it is desired to open once more the upper grill unit 22, the adjustment knob 92 may be rotated to align the positioning blocks 923 with the through holes 611 of the second seat member 6. At this time, the resilient component 91 pushes the rotatable wheel 8 toward the stationary wheel 7, thereby moving the adjustment knob 92 toward the first seat member 5 and resulting in engagement between the positioning blocks 923 and the through holes 611. The adjustment knob 92 is thus restored to the retaining position, and the second ratchet teeth 81 may be switched once more between the first and second tooth positions to enable retention of the upper grill unit 22 at the desired open position and fine adjustment of the position of the upper grill unit 22 relative to the lower grill unit 21.

It has thus been shown that, in the grill device of this embodiment, the first ratchet teeth 71 and the second ratchet teeth 81 are configured such that, when the second ratchet teeth 81 are at the abutting position, the first ratchet teeth 71 and the second ratchet teeth 81 cooperate to permit rotation of the second seat member 6 in the first direction D1 relative to the first seat member 5 and to permit movement of the upper grill unit 22 in the first direction D1 for uncovering the lower grill unit 21, and to resist rotation of the second seat member 6 relative to the first seat member 5 in the second direction D2 and to resist movement of the upper grill unit 22 in the second direction D2 relative to the lower grill unit 21. The rotatable wheel 8 is co-rotatable with the second seat member 6, and the first ratchet teeth 71 and the second ratchet teeth 81 are configured such that, when the second ratchet teeth 81 are disposed at the abutting position and a force is applied to move the upper grill unit 22 and rotate the second seat member 6 in the first direction D1, the resilient component 91 repeatedly stores and releases a restoring force as a result of the second ratchet teeth 81 moving along the first ratchet teeth 71 in the first direction D1 while the second ratchet teeth 81 are at the abutting position. Moreover, the adjustment knob 92 may be pulled away from the stationary wheel 7 to move from the retaining position to the adjusting position. The second ratchet teeth 81 are disengaged from the first ratchet teeth 71 such that rotation of the second seat member 6 in the second direction D2 and movement of the upper grill unit 22 in the second direction D2 are not resisted by the first ratchet teeth 71 and the second ratchet teeth. 81 when the adjustment knob 92 is at the adjusting position. Moreover, by virtue of the first ratchet teeth 71 and the second ratchet teeth 81, multi-step fine adjustment of the position of the upper grill unit 22 relative to the lower grill unit 21 is possible.

Figure 10:
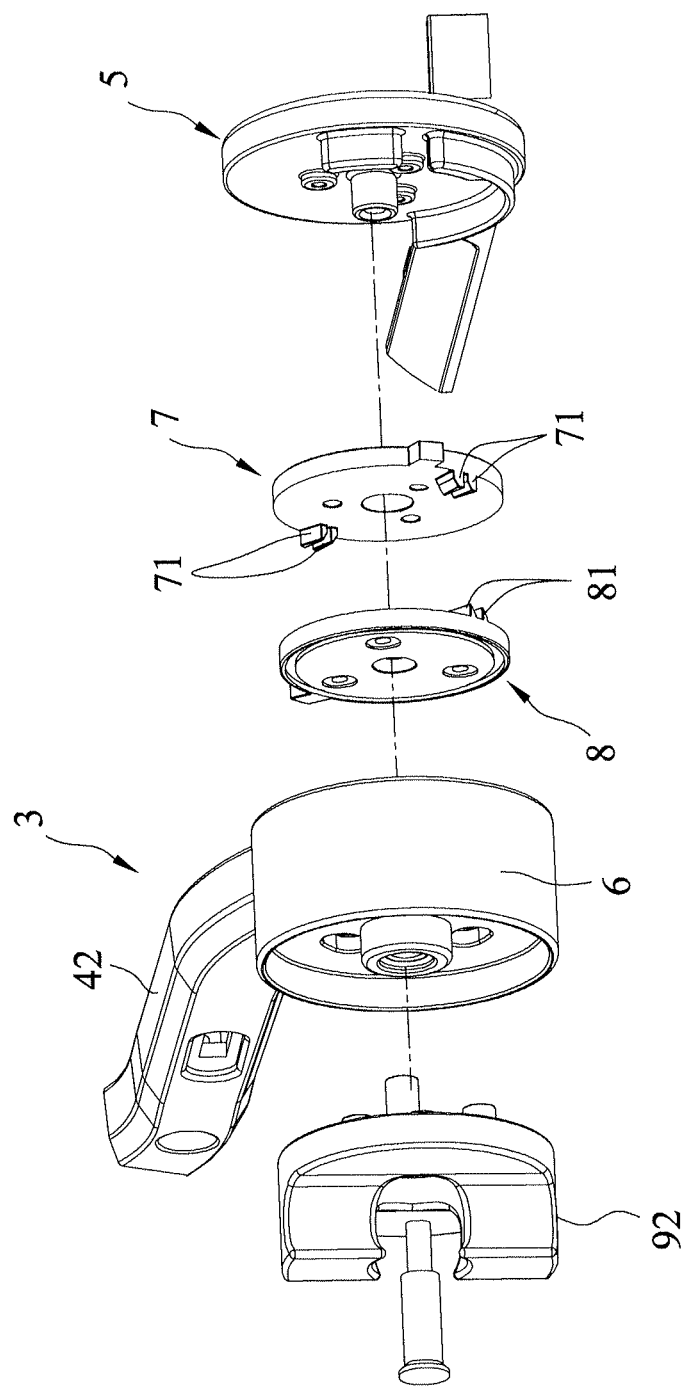
FIG. 10 is an exploded perspective view illustrating a coupling mechanism included in a second embodiment of the grill device according to the disclosure.

FIG. 10 illustrates the second embodiment of a grill device according to the disclosure. In this embodiment, the resilient component 91 is omitted from the coupling mechanism 3, the first ratchet teeth 71 of the stationary wheel 7 are spaced apart from each other in a circumferential direction, and the second ratchet teeth 81 of the rotatable wheel 8 are spaced apart from each other in the circumferential direction. In the second embodiment, the user may quickly adjust the upper grill unit 22 to a selected one of two open positions relative to the lower grill unit 21.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill device comprising a lower grill unit, an upper grill unit, and a coupling mechanism that connects the upper grill unit to the lower grill unit, the coupling mechanism including
    a connection base connected to the lower grill unit,
    a lever connected to the upper grill unit,
    a first seat member connected to the connection base,
    a second seat member connected to the lever, coupled pivotally to the first seat member, and rotatable relative to the first seat member about a pivot axis, and
    a ratchet unit including
        first ratchet teeth disposed adjacent to one of the first seat member and the second seat member, and
        second ratchet teeth disposed adjacent to the other one of the first seat member and the second seat member, movable relative to the other one of the first seat member and the second seat member along the pivot axis, and abutting against the first ratchet teeth when the second ratchet teeth are at an abutting position relative to the other one of the first seat member and the second seat member,
        the first ratchet teeth and the second ratchet teeth being configured such that, when the second ratchet teeth are at the abutting position, the first ratchet teeth and the second ratchet teeth cooperate to permit rotation of the second seat member in a first direction relative to the first seat member and to permit movement of the upper grill unit in the first direction for uncovering the lower grill unit, and to resist rotation of the second seat member relative to the first seat member in a second direction opposite to the first direction and to resist movement of the upper grill unit in the second direction relative to the lower grill unit.

2. The grill device of claim 1, wherein the ratchet unit further includes a rotatable wheel disposed adjacent to the second seat member, movable relative to the second seat member along the pivot axis, and provided with the second ratchet teeth.

3. The grill device of claim 2, wherein the ratchet unit further includes a stationary wheel non-movably disposed adjacent to the first seat member and provided with the first ratchet teeth.

4. The grill device of claim 3, wherein at least one of the rotatable wheel and the stationary wheel is a crown-ratchet wheel.

5. The grill device of claim 4, wherein the first ratchet teeth are arranged in a circumferential row at the stationary wheel, and the second ratchet teeth are arranged in a circumferential row at the rotatable wheel.

6. The grill device of claim 3, wherein the ratchet unit further includes a resilient component disposed to bias the rotatable wheel toward the stationary wheel.

7. The grill device of claim 6, wherein the rotatable wheel is co-rotatable with the second seat member, and the first ratchet teeth and the second ratchet teeth are configured such that, when the second ratchet teeth are disposed at the abutting position and a force is applied to move the upper grill unit and rotate the second seat member in the first direction, the resilient component repeatedly stores and releases a restoring force as a result of the second ratchet teeth moving along the first ratchet teeth in the first direction while the second ratchet teeth are at the abutting position.

8. The grill device of claim 7, wherein the coupling mechanism further includes an adjustment knob disposed at the second seat member, connected to the rotatable wheel, and movable relative to the second seat member along the pivot axis between a retaining position and an adjusting position, the second ratchet teeth being disposed at the abutting position when the adjustment knob is at the retaining position, the adjustment knob being pulled away from the stationary wheel to move from the retaining position to the adjusting position, the second ratchet teeth being disengaged from the first ratchet teeth such that rotation of the second seat member in the second direction and movement of the upper grill unit in the second direction are not resisted by the first ratchet teeth and the second ratchet teeth when the adjustment knob is at the adjusting position.

9. The grill device of claim 8, wherein:
    the second seat member has a base wall and a surrounding wall that extends from a periphery of the base wall in opposite directions,
    the base wall being formed with a plurality of through holes that are spaced apart from each other, and cooperating with the surrounding wall to define a remote receiving space and a proximate receiving space that are respectively distal from and proximate to the stationary wheel,
    the resilient component being disposed between the base wall and the rotatable wheel in the proximate receiving space, and providing a biasing force that biases the rotatable wheel away from the base wall and toward the stationary wheel,
    a portion of the adjustment knob being disposed in the remote receiving space,
    the adjustment knob having a plurality of connecting posts that extend through the through holes in the base wall and that are connected to the rotatable wheel,
    movement of the adjustment knob between the retaining position and the adjusting position resulting in corresponding movement of the rotatable wheel toward and away from the stationary wheel.

10. The grill device of claim 9, wherein:
    the adjustment knob further has a plurality of positioning blocks that are disposed in the through holes when the adjustment knob is at the retaining position,
    the adjustment knob being pulled away from the base wall of the second seat member to remove the positioning blocks from the through holes and being rotated thereafter to result in misalignment between the positioning blocks and the through holes and abutment between the positioning blocks and the base wall, thereby switching the adjustment knob from the retaining position to the adjusting position.

11. The grill device of claim 10, wherein the adjustment knob has a knob wall disposed in the remote receiving space of the second seat member, and a handling part that extends from the knob wall in a direction away from the base wall of the second seat member, the connecting posts extending from the knob wall.

12. The grill device of claim 7, wherein:
the first seat member has a base wall and a surrounding wall that extends from the base wall in a direction toward the second seat member,
the base wall and the surrounding wall cooperating to define a space that has the stationary wheel disposed therein,
the surrounding wall having a plurality of stop surfaces and a plurality of guide surfaces that are alternatingly disposed, and a plurality of connecting surfaces each interconnecting an adjacent pair of the stop surfaces and the guide surfaces and each spaced apart from the base wall,
the surrounding wall further having a plurality of slide grooves, each disposed between an adjacent pair of the connecting surfaces, each defined by an adjacent pair of the stop surfaces and the guide surfaces, and each extending toward the base wall,
the rotatable wheel having an outer edge provided with a plurality of guide blocks that project toward the first seat member and that extend into the slide grooves when the second ratchet teeth are at the abutting position,
the rotatable wheel being rotatable to move the guide blocks in the slide grooves along the guide surfaces so as to abut against the connecting surfaces of the surrounding wall of the first seat member,
the second ratchet teeth being disengaged from the first ratchet teeth when the guide blocks abut against the connecting surfaces.

13. The grill device of claim 1, wherein:
each of the first ratchet teeth has a first limiting surface that extends toward the rotatable wheel, and a first inclined surface that interconnects the first limiting surface of the first ratchet tooth and the first limiting surface of an adjacent one of the first ratchet teeth,
for each of the first ratchet teeth, a distance of the first inclined surface to the rotatable wheel is at a minimum at a junction with the first limiting surface and gradually increases in the second direction,
each of the second ratchet teeth has a second limiting surface that extends toward the stationary wheel, and a second inclined surface that interconnects the second limiting surface of the second ratchet tooth and the second limiting surface of an adjacent one of the second ratchet teeth,
for each of the second ratchet teeth, a distance of the second inclined surface to the stationary wheel is at a minimum at a junction with the second limiting surface and gradually increases in the first direction,
the second inclined surfaces are slidable along the first inclined surfaces to permit rotation of the rotatable wheel in the first direction relative to the stationary wheel,
the second limiting surfaces abut against the first limiting surfaces to resist rotation of the rotatable wheel in the second direction relative to the stationary wheel.

14. The grill device of claim 13, wherein the first ratchet teeth are spaced apart from each other in a circumferential direction, and the second ratchet teeth are spaced apart from each other in the circumferential direction.

* * * * *